US 8,034,461 B2

(12) United States Patent
Breese et al.

(10) Patent No.: US 8,034,461 B2
(45) Date of Patent: Oct. 11, 2011

(54) PREPARATION OF MULTILAYER POLYETHYLENE THIN FILMS

(75) Inventors: D. Ryan Breese, Loveland, OH (US); Kelly L. Williams, Maineville, OH (US); Charles S. Holland, Coal City, IL (US); Mark P. Mack, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 1520 days.

(21) Appl. No.: 11/054,202

(22) Filed: Feb. 9, 2005

(65) Prior Publication Data
US 2006/0177681 A1 Aug. 10, 2006

(51) Int. Cl.
*B32B 11/08* (2006.01)
*B32B 27/08* (2006.01)
(52) U.S. Cl. .................... 428/516; 428/910; 264/291
(58) Field of Classification Search .............. 428/910, 428/516; 524/570, 587; 525/211, 240; 264/291
See application file for complete search history.

(56) References Cited

U.S. PATENT DOCUMENTS

| 4,542,199 | A | 9/1985 | Kaminsky et al. ............ 526/160 |
| 4,870,122 | A * | 9/1989 | Lu ................................. 524/488 |
| 5,539,124 | A | 7/1996 | Etherton et al. .............. 548/402 |
| 5,637,660 | A | 6/1997 | Nagy et al. .................... 526/160 |
| 5,756,611 | A | 5/1998 | Etherton et al. .............. 526/127 |
| 5,840,244 | A * | 11/1998 | Firdaus et al. ................ 264/565 |
| 6,034,027 | A | 3/2000 | Krishnamurti et al. ....... 502/200 |
| 6,265,504 | B1 | 7/2001 | Liu et al. ....................... 526/161 |
| 6,391,411 | B1 | 5/2002 | Duckwall, Jr. et al. ...... 428/35.7 |
| 6,432,496 | B1 * | 8/2002 | Klosiewicz ................. 428/36.92 |
| 6,486,270 | B1 | 11/2002 | Garrison et al. ................ 526/65 |
| 6,602,598 | B1 * | 8/2003 | Simpson et al. ........ 428/355 EN |
| 6,613,841 | B2 | 9/2003 | Williams ....................... 525/191 |
| 6,770,715 | B2 * | 8/2004 | Garrison et al. .............. 525/240 |
| 6,887,923 | B2 | 5/2005 | Bowling et al. ................ 524/62 |
| 6,936,675 | B2 * | 8/2005 | Szul et al. ................... 526/348.2 |

FOREIGN PATENT DOCUMENTS
EP 0341188 * 5/1989
* cited by examiner

*Primary Examiner* — Kevin R. Kruer

(57) ABSTRACT

A method for making multilayer thin films is disclosed. The method of comprises orienting a thick multilayer film in the machine direction at a drawdown ratio effective to produce a multilayer thin film. The thick multilayer film has a thickness within the range of 1 mil to 5 mils and comprises at least one layer of a linear low density polyethylene (LLDPE) and at least one layer of a high density polyethylene (HDPE) or a medium density polyethylene (MDPE).

22 Claims, No Drawings

PREPARATION OF MULTILAYER POLYETHYLENE THIN FILMS

FIELD OF THE INVENTION

The invention relates to polyethylene films. More particularly, the invention relates to machine-direction oriented multilayer thin films.

BACKGROUND OF THE INVENTION

Polyethylene is divided into high-density (HDPE, density 0.941 g/cm³ or greater), medium-density (MDPE, density from 0.926 to 0.940 g/cm³), low-density (LDPE, density from 0.910 to 0.925 g/cm³), and linear low-density polyethylene (LLDPE, density from 0.910 to 0.925 g/cm³). See ASTM D4976-98: Standard Specification for Polyethylene Plastic Molding and Extrusion Materials. Polyethylene can also be divided by molecular weight. For instance, ultra-high molecular weight polyethylene denotes those which have a weight average molecular weight (Mw) greater than 3,000,000. See U.S. Pat. No. 6,265,504. High molecular weight polyethylene usually denotes those which have an Mw from 130,000 to 1,000,000.

One of the main uses of polyethylene (HDPE, MDPE, LLDPE, and LDPE) is in film applications, such as grocery sacks, institutional and consumer can liners, merchandise bags, shipping sacks, food packaging films, multi-wall bag liners, produce bags, deli wraps, stretch wraps, and shrink wraps. The key physical properties of polyethylene film include tear strength, impact strength, tensile strength, stiffness and transparency. Film stiffness can be measured by modulus. Modulus is the resistance of the film to deformation under stress.

Machine direction orientation (MDO) is known to the polyolefin industry. When a polymer is strained under uniaxial stress, the orientation becomes aligned in the direction of pull. For instance, U.S. Pat. No. 6,391,411 teaches the MDO of high molecular weight (both Mn and Mw greater than 1,000,000) HDPE films. However, MDO of such high molecular weight HDPE films are limited because these films are difficult to stretch to a high drawdown ratio.

The current polyethylene films typically compromise several properties, such as modulus, yield strength, and break strength, to meet the package requirements for dart drop impact strength. Polymer films that do not compromise such properties are desirable for improving the performance of the bags, as well as the economics associated with producing and filling the bags. For example, by increasing the modulus and the yield strength of the film, larger bags can be produced, which would allow packaging larger quantities of goods while retaining their shape after being handled by the consumer. Bags with higher modulus would also allow the filling lines to run faster, improving the overall economics of the filling process.

By increasing the yield strength of the film, the bags would be less likely to elongate under stress and therefore they retain the original shape and dimensions. This would reduce the amount of breaks which are resulted from the film yielding and thinning under load. Also, the printed surface of the bag would not be distorted, maintaining the aesthetic quality of the package and enhancing brand recognition by the consumer.

In addition, the films that do not compromise the aforementioned properties could allow the reduction in the film thickness, further improving the economics associated with the products. Such innovations are desirable to all in the can liner and retailer bag industry for creating new products that provide both performance and economic benefit.

SUMMARY OF THE INVENTION

The invention is a method for producing a multilayer thin film by machine-direction orientation. By "thin film," we mean that the film has a thickness within the range of about 0.1 mil to about 1 mil, preferably from about 0.4 mil to about 0.8 mil, and most preferably from about 0.5 mil to about 0.8 mil.

The method of the invention comprises orienting a multilayer film in the machine direction (MD) at a drawdown ratio effective to produce a multilayer thin film. The multilayer film has a thickness preferably within the range of 1 mil to 5 mils and comprises at least one layer of a linear low density polyethylene (LLDPE) and at least one layer of a high density polyethylene (HDPE) or a medium density polyethylene (MDPE).

Conventional multilayer films are relatively thick. Multilayer thin films are difficult to make by co-extrusion process because each layer requires a minimum thickness. We surprisingly found that a multilayer thin film can be readily made by machine-direction orientation (MDO) from a thick, multilayer film. We found that the multilayer thin film made by the method of the invention has a combination of physical properties which are significantly better than that of a multilayer thin film which has equal thickness but made directly by co-extrusion without MDO. More particularly, the multilayer thin film has considerably improved MD tear strength. The thin film has a normalized MD tear strength of 44 grams/mil or greater.

DETAILED DESCRIPTION OF THE INVENTION

The method of the invention comprises orienting a thick multilayer film in the machine-direction (MD) at a drawdown ratio effective to produce a multilayer thin film. The thin film has a thickness within the range of about 0.1 mil to about 1 mil. Preferably, the thin film has a thickness within the range of about 0.4 mil to about 0.8 mil. More preferably, the thin film has a thickness within the range of about 0.5 mil to about 0.8 mil.

The multilayer film comprises at least one layer of a linear low density polyethylene (LLDPE) and at least one layer of a high density polyethylene (HDPE) or a medium density polyethylene (MDPE). Suitable LLDPE preferably is copolymers of ethylene with from about 5 wt % to about 15 wt % of a long chain α-olefin such as 1-butene, 1-hexene, and 1-octene. Suitable LLDPE includes those which have a density within the range of about 0.910 g/cm³ to about 0.925 g/cm³. Suitable LLDPE also includes the so called very low-density polyethylene (VLDPE). Suitable VLDPE has a density within the range of 0.865 g/cm³ to 0.910 g/cm³.

Suitable MDPE preferably has a density within the range of about 0.926 g/cm³ to about 0.940 g/cm³. More preferably, the density is within the range of about 0.930 g/cm³ to about 0.940 g/cm³. Preferred MDPE is a copolymer that comprises from about 85 wt % to about 98 wt % of recurring units of ethylene and from about 2 wt % to about 15 wt % of recurring units of a $C_3$ to $C_{10}$ α-olefin. Suitable $C_3$ to $C_{10}$ α-olefins include propylene, 1-butene, 1-pentene, 1-hexene, 4-methyl-1-pentene, and 1-octene, and the like, and mixtures thereof.

Preferably, the MDPE has a bimodal or multimodal molecular weight distribution. Method for making bimodal or multimodal MDPE is known. For instance, U.S. Pat. No.

6,486,270, the teachings of which are herein incorporated by reference, teaches the preparation of MDPE by a multiple-zone process.

Suitable HDPE preferably has a density within the range of about 0.941 g/cm³ to about 0.970 g/cm³. More preferably, the density is within the range of about 0.945 g/cm³ to about 0.965 g/cm³. Most preferably, the density is within the range of 0.958 g/cm³ to 0.962 g/cm³.

Preferably, the LLDPE, MDPE and HDPE have an $MI_2$ from about 0.01 to about 1.5 dg/min, and more preferably from about 0.01 to about 1.0 dg/min. Preferably, the LLDPE, MDPE and HDPE have an MFR from about 50 to about 300. Melt index ($MI_2$) is usually used to measure polymer molecular weight, and melt flow ratio (MFR) is used to measure the molecular weight distribution. A larger $MI_2$ indicates a lower molecular weight. A larger MFR indicates a broader molecular weight distribution. MFR is the ratio of the high-load melt index (HLMI) to $MI_2$. The $MI_2$ and HLMI can be measured according to ASTM D-1238. The $MI_2$ is measured at 190° C. under 2.16 kg pressure. The HLMI is measured at 190° C. under 21.6 kg pressure.

Preferably, the LLDPE, MDPE, and HDPE have number average molecular weights (Mn) within the range of about 10,000 to about 500,000, more preferably from about 11,000 to about 50,000, and most preferably from about 11,000 to about 35,000. Preferably, the LLDPE, MDPE, and HDPE have weight average molecular weights (Mw) within the range of about 120,000 to about 1,000,000, more preferably from about 135,000 to about 500,000, and most preferably from about 140,000 to about 250,000. Preferably, the LLDPE, MDPE, and HDPE have molecular weight distributions (Mw/Mn) within the range of about 3 to about 20, more preferably from about 4 to about 18, and most preferably from about 5 to about 17.

The Mw, Mn, and Mw/Mn are obtained by gel permeation chromatography (GPC) on a Waters GPC2000CV high temperature instrument equipped with a mixed bed GPC column (Polymer Labs mixed B-LS) and 1,2,4-trichlorobenzene (TCB) as the mobile phase. The mobile phase is used at a nominal flow rate of 1.0 mL/min and a temperature of 145° C. No antioxidant is added to the mobile phase, but 800 ppm BHT is added to the solvent used for sample dissolution. Polymer samples are heated at 175° C. for two hours with gentle agitation every 30 minutes. Injection volume is 100 microliters.

The Mw and Mn are calculated using the cumulative matching % calibration procedure employed by the Waters Millennium 4.0 software. This involves first generating a calibration curve using narrow polystyrene standards (PSS, products of Waters Corporation), then developing a polyethylene calibration by the Universal Calibration procedure.

Suitable LLDPE, MDPE, and HDPE can be produced by Ziegler, single-site, or any other olefin polymerization catalysts. Ziegler catalysts are well known. Examples of suitable Ziegler catalysts include titanium halides, titanium alkoxides, vanadium halides, and mixtures thereof. Ziegler catalysts are used with cocatalysts such as alkyl aluminum compounds.

Single-site catalysts can be divided into metallocene and non-metallocene. Metallocene single-site catalysts are transition metal compounds that contain cyclopentadienyl (Cp) or Cp derivative ligands. For example, U.S. Pat. No. 4,542,199, the teachings of which are incorporated herein by reference, teaches metallocene catalysts. Non-metallocene single-site catalysts contain ligands other than Cp but have the same catalytic characteristics as metallocenes. The non-metallocene single-site catalysts may contain heteroatomic ligands, e.g., boraaryl, pyrrolyl, azaborolinyl or quinolinyl. For example, U.S. Pat. Nos. 6,034,027, 5,539,124, 5,756,611, and 5,637,660, the teachings of which are incorporated herein by reference, teach non-metallocene catalysts.

Optionally, the multilayer film comprises other layers such as gas-barrier, adhesive, medical, flame retardant layers, and the like. Suitable materials for the optional layers include poly(vinylidene chloride), poly(vinyl alcohol), polyamide (Nylon), polyacrylonitrile, ethylene-vinyl acetate copolymers (EVA), ethylene-methyl acrylate copolymers (EMA), ethylene-acrylic acid copolymers (EAA), ionomers, maleic anhydride grafted polyolefins, K-resins (styrene/butadiene block copolymers), and poly(ethylene terephthalate) (PET), the like, and mixtures thereof. One advantage of the invention is that these optional layers are not necessary to be used. The polymers of these optional layers are often significantly more expensive than polyethylene.

The multilayer films can be made by co-extrusion, coating, and any other laminating processes. They can be made by casting or blown film processes. Blown film process includes high-stalk and in-pocket processes. The difference between the high-stalk process and the in-pocket process is that in the high-stalk process, the extruded tube is inflated a distance (i.e., the length of the stalk) from the extrusion die, while the extruded tube in the in-pocket process is inflated as the tube exits the extrusion die.

Preferably, the multilayer film is a three-layer film selected from the group consisting of HDPE/LLDPE/HDPE, HDPE/LLDPE/MDPE, and MDPE/LLDPE/MDPE. More preferably, the multilayer film is selected from the group consisting of HDPE/LLDPE/HDPE and MDPE/LLDPE/MDPE three-layer films in which each HDPE or MDPE is the same or different. Preferably, each layer has an equal thickness. Preferably, the multilayer film has a total thickness from about 1 mil to about 5 mils.

The multilayer film is uniaxially oriented in the machine (or processing) direction. This is so called MDO. During the MDO, the film from the blown-film line or other film process is heated to an orientation temperature. Preferably, the orientation temperature is 5° C. to 7° C. below the melting temperature of the outer layer polymer. The heating is preferably performed utilizing multiple heating rollers.

Next, the heated film is fed into a slow drawing roll with a nip roller, which has the same rolling speed as the heating rollers. The film then enters a fast drawing roll. The fast drawing roll has a speed that is 2 to 10 times faster than the slow draw roll, which effectively orients the film on a continuous basis.

The oriented film then enters annealing thermal rollers, which allow stress relaxation by holding the film at an elevated temperature for a period of time. The annealing temperature is preferably within the range of about 100° C. to about 125° C. and the annealing time is within the range of about 1 to about 2 seconds. Finally, the film is cooled through cooling rollers to an ambient temperature.

The ratio of the film thickness before and after orientation is called "drawdown ratio." For example, when a 2-mil film is oriented to 0.5-mil film, the drawdown ratio is 4:1. The drawdown ratio varies depending on many factors including the desired thin film thickness, thin film properties, and multilayer film structures. We found that for an HDPE/LLDPE/HDPE three-layer film, the MD tear strength of the thin film increases fast with the drawdown ratio in the range of about 2:1 to about 4:1 and it remains essentially flat thereafter. For an MDPE/LLDPE/MDPE three-layer film, the MD tear strength has a peak value at the drawdown ratio of about 4:1.

The invention includes the thin film made by the method of the invention. The thin film has normalized MD tear strength greater than or equal to 44 grams/mil. A normalized value is obtained by dividing the measured MD tear value by the thin film thickness. MD tear is measured according to ASTM D1922. Preferably, the thin film has a normalized MD tear strength greater than 150 grams/mil. More preferably, the thin film has a normalized MD tear strength greater than 200 grams/mil.

The thin film of the invention not only has a high MD tear strength, but also has an excellent combination of other properties. Preferably, the film of the invention has a 1% secant MD and TD (transverse direction) modulus greater than 150,000 psi, and more preferably greater than 200,000 psi. Modulus is tested according to ASTM E-111-97.

Preferably, the thin film has an MD tensile strength at yield greater than or equal to 4,000 psi, and more preferably greater than or equal to 5,000 psi. Preferably, the thin film has an MD tensile strength at break greater than 9,000 psi, more preferably greater than 20,000 psi, and most preferably greater than 25,000 psi. Tensile strength is tested according to ASTM D-882.

Preferably, the thin film has a haze less than 80%, more preferably less than 60%, and most preferably less than 30%. The haze is tested according to ASTM D1003-92: Standard Test Method for Haze and Luminous Transmittance of Transparent Plastics, Oct. 1992. Preferably, the film has a gloss greater than 8, and more preferably greater than 30. The gloss is tested according to ASTM D2457-90: Standard Test Method for Specular Gloss of Plastic Films and Solid Plastics.

In addition, the thin film of the invention has an acceptable dart-drop strength. Preferably, the thin film has a dart-drop strength greater than 50 grams, and more preferably greater than 100 grams. The dart-drop strength is tested according to ASTM D1709.

The thin film made by the method of the invention has many uses. While there are few polyethylene films that have the combination of high MD and TD moduli, high dart drop impact strength, high tear strength, and high break and yield strengths, there is an increasing demand for such films. For example, the T-shirt bag (grocery bag) has been one of the fastest growing segments of the polymer film industry over the past several years, largely due to the costs savings and performance enhancements associated with replacing paper bags. Such bags are typically used to transport purchased goods from the retail store to the consumer's home. The current polymer films typically compromise several properties, such as modulus, yield strength, and break strength, to meet the package requirements for dart drop impact strength and tear strength. Polymer films that do not compromise such properties are desirable for improving the performance of the bag, as well as the economics associated with producing and filling the bag. The method of the invention allows the polymer film manufacturers to reduce the total thickness of the films, further improving the economics associated with the products.

The following examples merely illustrate the invention. Those skilled in the art will recognize many variations that are within the spirit of the invention and scope of the claims.

EXAMPLES 1-6

Machine Direction Orientation of
MDPE/LLDPE/MDPE Three-Layer Coextruded
Films

A medium density polyethylene (XL3805, product of Equistar Chemicals, LP, $MI_2$: 0.057 dg/min, density: 0.938 $g/cm^3$, Mn: 18,000, Mw: 209,000) is coextruded with a linear low density polyethylene (GS707, product of Equistar Chemicals, LP, density: 0.915 $g/cm^3$, $MI_2$: 0.700 dg/min, Mn: 30,000, Mw: 120,000) and converted into equally layered MDPE/LLDPE/MDPE three-layer films on 200 mm die with 2.0 mm die gap. The films are produced by a high stalk technique with a neck height of eight die diameters and at a blow-up ratio (BUR) of 4:1. The film thicknesses in Examples C1, 2, 3, 4, 5, and 6 are 0.5, 1.0, 2.0, 3.0, 4.0 and 5.0 mils, respectively.

The films of Examples 2, 3, 4, 5 and 6 are machine-direction oriented to final thickness less than 1 mil with various drawdown ratios. The film of Example C1 does not subject to machine direction orientation. The machine direction orientation is performed on a commercial-scale Hosokawa-Alpine MDO unit. The unit consists of preheating, drawing, annealing, and cooling sections, with each set at specific temperatures to optimize the performance of the unit and produce films with the desired properties. The preheating, drawing, and annealing sections are operated at temperatures approximately 5° C. to 7° C. below the melting temperature of the outer layer film. The cooling section is operated at ambient conditions. The film properties are listed in Table 1. The MD tear is a normalized value, i.e., the measured MD tear value divided by the thin film thickness.

EXAMPLES 7-12

Machine Direction Orientation of
HDPE/LLDPE/HDPE Three-Layer Coextruded
Films

The general procedure of Examples 1-6 is repeated. A high density polyethylene (L5906, product of Equistar Chemicals, LP, $MI_2$: 0.057 dg/min, density: 0.959 $g/cm^3$, Mn: 13,000, Mw: 207,000) is coextruded with a linear low density polyethylene (GS707, product of Equistar Chemicals, LP, density: 0.915 $g/cm^3$, $MI_2$: 0.700 dg/min, Mn: 30,000, Mw: 120,000) and converted into an equally layered HDPE/LLDPE/HDPE three-layer films on 200 mm die with 2.0 mm die gap. The films are produced by a high stalk technique with a neck height of eight die diameters and at a blow-up ratio (BUR) of 4:1.

The films of Examples 8, 9, 10, 11 and 12 are machine-direction oriented to final thickness less than 1 mil with various drawdown ratios. The is film of Example C7 does not subject to machine direction orientation. The film properties are listed in Table 2.

Example C13

Monolayer HDPE Thin Film

A high density polyethylene (L5005, product of Equistar Chemicals, LP) is converted into a monolayer film with a thickness 0.5 mil on 200 mm die with 2.0 mm die gap. The film is produced by a high stalk technique with a neck height of eight die diameters and at a blow-up ratio (BUR) of 4:1. This film is not machine-direction oriented and it is representative of the incumbent film used in high tensile strength, thin film applications. The film properties are listed in Table 3.

TABLE 1

PROPERTIES v. ORIGINAL FILM THICKNESS OF MD ORIENTED MDPE-LLDPE-MDPE THREE-LAYER COEXTRUDED FILMS

| Ex. No. | Film Thickness Before Orientation (mil) | Film Thickness After Orientation (mil) | Draw-Down Ratio | MD* Tear (g/mil) | Dart Drop F50 (g) | MD Modulus (kpsi) | TD* Modulus (kpsi) | MD Tensile Strength @ Yield (kpsi) | MD Tensile Strength @ Break (kpsi) | Gloss | Haze % |
|---|---|---|---|---|---|---|---|---|---|---|---|
| C1 | 0.52 | 0.52 | 1:1 | 42 | 408 | 72 | 73 | 3 | 10 | 6 | 67 |
| 2 | 1.0 | 0.45 | 2.2:1 | 222 | 92 | 93 | 115 | 9 | 18 | 17 | 51 |
| 3 | 2.0 | 0.65 | 3.1:1 | 151 | 75 | 96 | 110 | 8 | 19 | 15 | 51 |
| 4 | 3.0 | 0.79 | 3.8:1 | 215 | 63 | 112 | 129 | 11 | 21 | 24 | 38 |
| 5 | 4.0 | 0.64 | 6.3:1 | 83 | 164 | 202 | 156 | 14 | 37 | 34 | 29 |
| 6 | 5.0 | 0.61 | 8.2:1 | 44 | 210 | 235 | 151 | 21 | 40 | 34 | 30 |

*MD: machine direction;
TD: transverse direction.

TABLE 2

PROPERTIES v. ORIGINAL FILM THICKNESS OF MD ORIENTED HDPE-LLDPE-HDPE THREE LAYER COEXTRUDED FILMS

| Ex. No. | Film thickness before orientation (mil) | Film thickness after orientation (mil) | Draw down Ratio | MD Tear (g/mil) | Dart Drop F50 (g) | MD Modulus (kpsi) | TD Modulus (kpsi) | MD Tensile Strength @ Yield (kpsi) | MD Tensile Strength @ Break (kpsi) | Gloss | Haze % |
|---|---|---|---|---|---|---|---|---|---|---|---|
| C7 | 0.52 | 0.52 | 1:1 | 20 | 309 | 125 | 129 | 4 | 9 | 8 | 81 |
| 8 | 1.0 | 0.52 | 1.9:1 | 6 | 120 | 145 | 163 | 3 | 15 | 6 | 80 |
| 9 | 2.0 | 0.57 | 3.5:1 | 161 | 36 | 219 | 200 | 5 | 25 | 14 | 61 |
| 10 | 3.0 | 0.69 | 4.3:1 | 203 | 65 | 253 | 204 | 4 | 22 | 14 | 59 |
| 11 | 4.0 | 0.77 | 5.2:1 | 169 | 66 | 295 | 209 | 6 | 31 | 19 | 49 |
| 12 | 5.0 | 0.82 | 6.1:1 | 159 | 108 | 311 | 215 | 5 | 29 | 23 | 45 |

TABLE 3

PROPERTIES of HDPE MONOLAYER THIN FILM

| Ex. No. | Film thickness before orientation (mil) | Film thickness after orientation (mil) | Draw down Ratio | MD Tear (g/mil) | Dart Drop F50 (g) | MD Modulus (kpsi) | TD Modulus (kpsi) | MD Tensile Strength @ Yield (kpsi) | MD Tensile Strength @ Break (kpsi) | Gloss | Haze % |
|---|---|---|---|---|---|---|---|---|---|---|---|
| C13 | 0.53 | 0.53 | 1:1 | 38 | 336 | 126 | 141 | 5 | 12 | 7 | 75 |

We claim:

1. A method for producing a multilayer thin film, said method comprising providing a multilayer film and uniaxially orienting the multilayer film in the machine direction at a drawdown ratio effective to produce a thin film having a thickness within the range of about 0.1 mil to about 1 mil, wherein the multilayer film comprises at least one layer of a linear low density polyethylene (LLDPE) and at least one layer of a high density polyethylene (HDPE) or a medium density polyethylene (MDPE).

2. The method of claim 1 wherein the thin film has a machine-direction tear strength of 44 grams/mil or greater.

3. The method of claim 1 wherein the thin film has a thickness within the range of about 0.4 mil to about 0.8 mil.

4. The method of claim 1 wherein the thin film has a thickness within the range of about 0.5 mil to about 0.8 mil.

5. The method of claim 1 wherein the multilayer film is an HDPE/LLDPE/HDPE three-layer film.

6. The method of claim 5 wherein the thin film has a machine-direction tear strength greater than 150 grams/mil.

7. The method of claim 5 wherein the thin film has a machine-direction tear strength greater than 200 grams/mil.

8. The method of claim 5 wherein the drawdown ratio is within the range of about 3 to about 6.

9. The method of claim 5 wherein the drawdown ratio is within the range of about 4 to about 6.

10. The method of claim 5 wherein each HDPE has a density, the same or different, within the range of 0.945 to 0.965 g/cm$^3$ and the LLDPE has a density within the range of 0.865 to 0.925 g/cm$^3$.

11. The method of claim 5 wherein the LLDPE and each HDPE have weight average molecular weights, the same or different, within the range of 120,000 to 1,000,000 and number average molecular weights, the same or different, within the range of 10,000 to 500,000.

12. The method of claim 1 wherein the multilayer film is an MDPE/LLDPE/MDPE three-layer film.

13. The method of claim 12 wherein the thin film has a machine-direction tear strength greater than 150 grams/mil.

14. The method of claim 12 wherein the thin film has a machine-direction tear strength greater than 200 grams.

15. The method of claim 12 wherein the drawdown ratio is within the range of about 2 to about 6.

16. The method of claim 12 wherein the drawdown ratio is within the range of about 2 to about 4.

17. The method of claim 12 wherein each MDPE has a density, the same or different, within the range of 0.930 to 0.940 g/cm$^3$ and the LLDPE has a density within the range of 0.865 to 0.925 g/cm$^3$.

18. The method of claim 12 wherein the LLDPE and each MDPE, the same or different, have weight average molecular weights within the range of 120,000 to 1,000,000 and number average molecular weights, the same or different, within the range of 10,000 to 500,000.

19. A thin film made by the method of claim 5.
20. An article made from the thin film of claim 19.
21. A thin film made by the method of claim 12.
22. An article made from the thin film of claim 21.

\* \* \* \* \*